No. 895,838. PATENTED AUG. 11, 1908.
J. C. BOOTH.
AUTOMATIC PUMP FOR TIRES.
APPLICATION FILED AUG. 16, 1906.
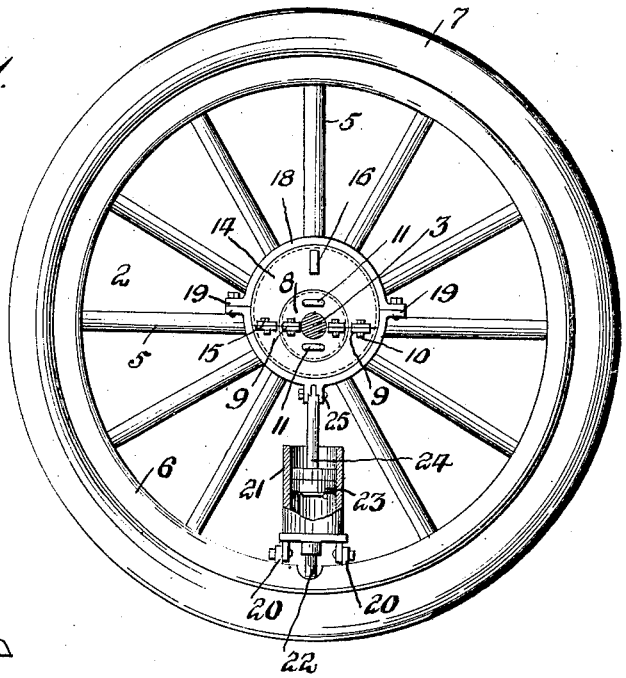
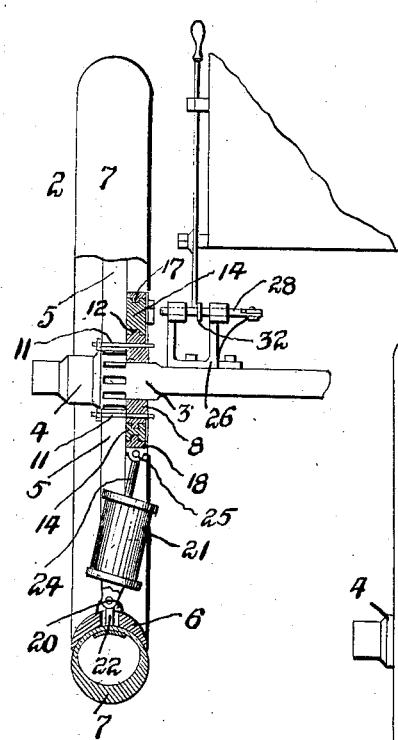
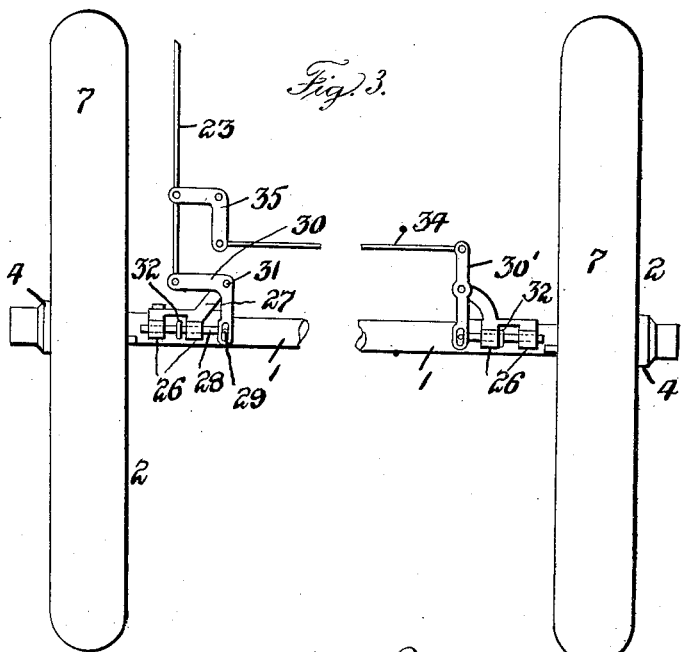
Witnesses
A. H. Rabság,
Inventor
James C. Booth,
Attorneys

UNITED STATES PATENT OFFICE.

JAMES C. BOOTH, OF COLUMBUS, OHIO.

AUTOMATIC PUMP FOR TIRES.

No. 895,838.  Specification of Letters Patent.  Patented Aug. 11, 1908.

Application filed August 16, 1906. Serial No. 330,800.

*To all whom it may concern:*

Be it known that I, JAMES C. BOOTH, a citizen of the United States of America, residing at Columbus, in the county of Franklin and State of Ohio, have invented certain new and useful Improvements in Automatic Pumps for Tires, of which the following is a specification, reference being had therein to the accompanying drawing.

This invention relates to wheels, and the invention relates more particularly to pneumatic wheels, as used upon motor driven vehicles.

The object of this invention is to provide novel means in connection with a pneumatic tired wheel to normally maintain the tire thereof in an inflated condition.

To this end, I provide a wheel with an automatically actuated pump controlled by the chauffeur of the vehicle. To operate the pump, I use the revoluble motion of a wheel in conjunction with an eccentric and clutch.

The detail construction of my improved wheel will be presently described and then specifically pointed out in the appended claims.

Referring to the drawing forming part of this specification, like numerals of reference designate corresponding parts throughout the several views, in which:—

Figure 1 is an elevation of the inner side of a wheel with the improved device applied and partly in section, Fig. 2 is an edge view of the same, partly in section, Fig. 3 is an edge view of two wheels journaled upon an axle, illustrating the pump controlling mechanism.

In the accompanying drawing, I have illustrated an axle 1, as having two pneumatic wheels 2 journaled upon the spindles 3, said wheels consisting of hubs 4, spokes 5, a rim 6 and a pneumatic tire 7 each tire having the usual air valve, indicated at 22, operating through the rim thereof.

The automatically actuated pump, together with the operating mechanism of each wheel is identical, therefore I deem it only necessary to describe the mechanism carried by one of said wheels.

My invention resides in providing the inner sides of the spokes 5 with a two-part circular plate 8, the parts of said plate surrounding the spindle 3 of the axle 1, and being flanged as at 9, and secured together by bolts and nuts 10. In addition to being secured together, the two parts of the circular plate are fastened to the spokes 5 by clips 11, which embrace some of said spokes. The two-part circular plate is provided with a peripheral tongue 12 and surrounding said plate is a two-part eccentric 14 having a circumferentially arranged groove to receive the tongue 12 of the two-part circular plate 8. The parts of the eccentric 14 are secured together, as at 15, similar to the two-parts of the circular plate 8. The inner face of the eccentric is provided with a lug or protuberance 16, the object of which will presently appear.

The periphery of the eccentric 14 is provided with a peripheral groove 17, to receive a circumferentially arranged tongue carried by a two-part eccentric ring or band 18, the parts of said band or ring being secured together as at 19.

The rim 6 between two of the spokes is provided with two lugs 20, and pivotally connected to said lugs is a pump cylinder 21 having a flexible connection 22, which connects with the usual air valve tube of the tire 7. In the pump cylinder 21 is mounted a conventional form of piston head 23 having an ordinary flap or air inlet valve. The piston head 23 is connected to the eccentric band or ring 18 by a piston rod 24, said rod being pivotally connected to the band or ring as at 25. The axle 1 adjacent to each wheel is provided with a bracket 26 carrying an outwardly extending arm 27. In the bracket 26 is mounted a rod 28, which connects, as at 29, with a bell crank lever 30 pivoted as at 31, upon the arm 27. The rod 28 is provided with a stop-collar 32 adapted to limit the movement of said rod towards the wheel. The bell crank lever 30 is connected to a rod 23, which extends in close proximity to the driver's seat of the vehicle.

In order that the rods 28 upon both sides of the vehicle can be simultaneously operated, straight levers 30' are used upon one side of the vehicle in lieu of the bell crank levers 30, the levers 30' connecting by a rod 34 with a bell crank lever 35 which is pivotally mounted at a suitable place upon the vehicle, whereby it may be connected to the rod 33.

I have simply illustrated one of the axles of the vehicle as equipped with my improved mechanism, but it will be understood that its associate axle is similarly equipped and controlled from the driver's seat of the vehicle.

While the vehicle is in operation, the rods 28 are normally maintained in the position shown in the accompanying drawings, but should one of the tires 7 be punctured or a leakage of air occur, the pump cylinder 21 of the injured wheel is immediately placed in operation to supply the tire 7 with air. This is accomplished by throwing the pins 28 outwardly until they engage the lugs or protuberances 16 of the eccentric 14 carried by the wheels of the vehicle. Since the wheels are journaled upon the axle 1, the eccentric 14 will be held stationary and the revolving pump cylinder 21 will be actuated through the medium of the eccentric band 18 and the piston rod 24 to pump air into the injured tire.

When the rods 28 are in their normal position, the eccentric 14, together with the various parts carried by the wheels of the vehicle, revolve, the eccentric 14 being the only element held stationary to insure a perfect operation of the pump cylinder 21, when the vehicle is in motion.

The peripheral tongues of the plate 8, and eccentric band 18 prevent said parts from being separated from the eccentric 14 when the same is held stationary, these tongues also guiding the plate 8 within the eccentric while the pump cylinder 21 is in operation.

I do not care to confine myself to the type of pneumatic wheel upon which my improved pump is used, or to the manner of controlling the operation of the same, as ordinary safety valves may be provided upon the tire 7, to prevent their bursting by an overcharge of air, or the valves may be placed upon the pump cylinders 21.

Such changes in the details of construction, as are permissible by the appended claims, may be resorted to without departing from the spirit and scope of the invention.

What I claim and desire to secure by Letters Patent, is:—

1. The combination with an axle having wheels journaled thereon and pneumatic tires carried by said wheels and with air valves operative through the rims thereof, of circular plates secured to said wheels, eccentrics revolubly mounted upon said plates and each having a laterally inward extending stop lug, and laterally extending flanges adapted to receive fastening means, eccentric bands mounted upon said eccentrics, pump cylinders pivotally carried by said wheels adjacent to the tires thereof and connecting with the air valves of said tires, pistons operating in said cylinders and connecting with said eccentric bands, rods slidably mounted upon said axle and adapted to engage the stop lugs of said eccentrics, and means to move said rods, substantially as described.

2. The combination with a vehicle including the axle having wheels mounted thereon and provided with pneumatic tires, each tire provided with an air valve operative through the rim of the wheel, spaced ears extending from said rim adjacent to said valve, a pump provided with a reciprocating plunger pivoted to said ears, a circular plate secured to said wheel concentric to its axle, an eccentric device rotative upon said plate, a band inclosing said eccentric device, connecting means between said band and pump plunger, and means under the control of the operator for holding the eccentric device in stationary position.

3. The combination with a vehicle including the axle having wheels mounted thereon and provided with pneumatic tires, each tire provided with an air valve operative through the rim of the wheel, spaced ears extending from said rim adjacent to said valve, a pump, provided with a reciprocating plunger and pivoted to said ears, a circular plate secured to said wheel concentric to its axle, an eccentric device rotative upon said plate and provided with a lateral stop, a band inclosing said eccentric device, connecting means between said band and pump plunger, a guide bracket carried by said axle, a stop rod movable through said bracket and adapted to be projected into the path of said lateral stop, and means under the control of the operator for actuating said stop rod.

In testimony whereof I affix my signature in the presence of two witnesses.

JAMES C. BOOTH.

Witnesses:
  Max H. Srolovitz,
  J. Booth.